Feb. 24, 1970

W. S. POWERS, JR 3,496,761

FLUIDIC FINISH SELECTOR

Filed May 15, 1967

WITNESS:
Esther M. Stockton

INVENTOR.
Whitney S. Powers, Jr.
BY
Clinton S. Janes
ATTORNEY

Fig. 2

Feb. 24, 1970 W. S. POWERS, JR 3,496,761
FLUIDIC FINISH SELECTOR
Filed May 15, 1967 8 Sheets-Sheet 3

Fig. 3

WITNESS:
Esther M. Stockton

INVENTOR.
Whitney S. Powers, Jr.
BY
Clinton L. James
ATTORNEY

Feb. 24, 1970    W. S. POWERS, JR    3,496,761
FLUIDIC FINISH SELECTOR
Filed May 15, 1967    8 Sheets-Sheet 5

WITNESS:
Esther M. Stockton

INVENTOR.
Whitney S. Powers, Jr.
BY Clinton S. Janes
ATTORNEY

Fig. 9

United States Patent Office 3,496,761
Patented Feb. 24, 1970

3,496,761
FLUIDIC FINISH SELECTOR
Whitney S. Powers, Jr., Pine City, N.Y., assignor to Powers Manufacturing Incorporated, Elmira, N.Y., a corporation of New York
Filed May 15, 1967, Ser. No. 638,254
Int. Cl. G01m 3/04
U.S. Cl. 73—45.2     10 Claims

ABSTRACT OF THE DISCLOSURE

The device, as used for testing glass bottles or the like, comprises a conveyer for carrying the bottles at a uniform speed through a test area where the mouth of the bottle is closed by a test fixture having a nozzle surrounded by a spring-pressed sealing diaphragm of predetermined elasticity. A metered volume of air is then injected through the nozzle into the bottle, and the retention of pressure in the bottle is sensed by comparison with a standard air pressure in a differential-pressure switch. If a leakage of air past the nozzle diaphragm is unacceptably rapid due to roughness, deforation or discontinuity of the sealing surface of the bottle, the switch causes actuation of means for ejecting the defective bottle from the conveyer after it has passed beyond the testing area.

---

The present invention relates to a fluidic finish selector, and more particularly to a device for testing the sealing surface of containers which will be capped or closed, and rejecting those containers whose sealing surfaces have irregularities greater than a predetermined maximum limit.

It is an object of the present invention to provide a novel testing device of the above character which is efficient and reliable in operation and simple and economical in construction.

It is another object to provide such a device which is easily adjustable to establish any desired limit of acceptable departure of the sealing surface from a perfectly smooth plane surface.

It is another object to provide such a device which is readily adaptable to test containers of various capacities and sizes of mouth openings.

Further objects and advantages will be apparent from the following description, taken in connection with the accompanying drawing in which:

Figure 1:
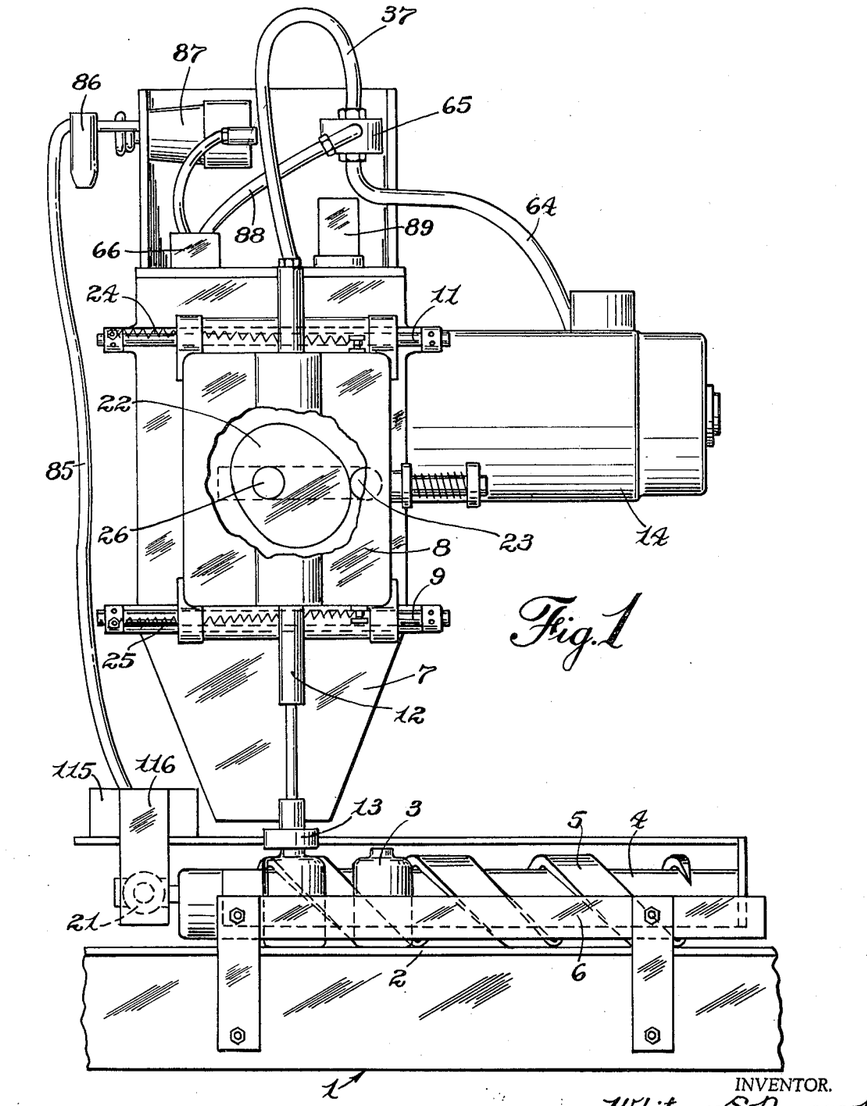
FIGURE 1 is a front elevation of the device showing a bottle in the testing area, the carriage of the test plunger assembly being partly broken away to show a portion of its traversing mechanism.
Figure 2:
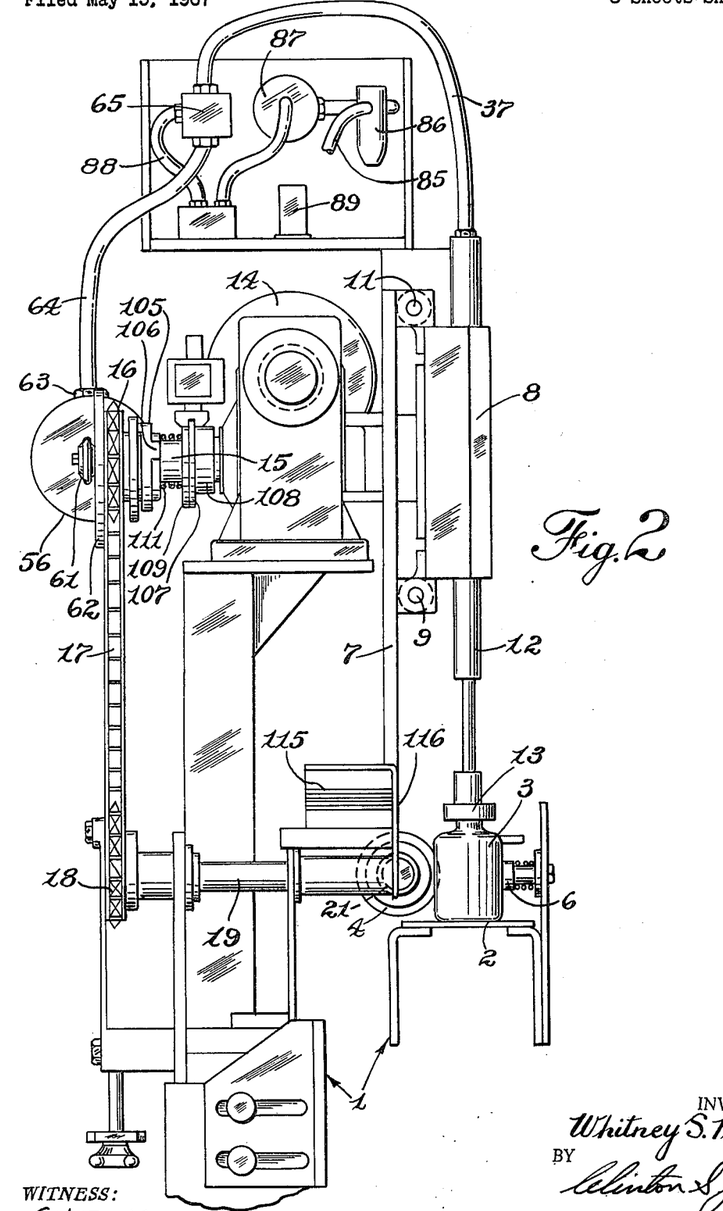
FIGURE 2 is a side elevation, showing the conveyer in section.

In FIGURES 1 and 2 of the drawing there is illustrated a frame 1 on which a link-type conveyer belt 2 is mounted for horizontal movement from right to left in FIGURE 1. A series of containers 3 to be tested, here shown in the form of glass bottles, are brought into the testing area by the conveyer 2, and are traversed through the testing area at uniform speed and in accurately spaced relation by a rotating cylinder 4 having a spiral thread 5 of appropriate pitch to receive and traverse the containers as they are held in the thread spaces by means of a spring mounted guide rail 6.

A support plate 7 is fixedly mounted on the frame 1, and a carriage member 8 is mounted thereon with freedom for limited horizontal sliding movement on guide bars 9 and 11.

A tubular telescopic plunger 12 is mounted for vertical movement in the carriage 8, directly above the path of the containers 3, and a test fitting 13 is detachably mounted on the lower end of the plunger in position to be brought into engagement with the mouth of a container by downward movement of the plunger.

Means, actuated from a common source of power, is provided for rotating the threaded cylinder 4 to traverse the container through the test area, for reciprocating the plunger 12 to move the test fitting into and out of engagement with a container as it moves through the test area, and for sliding the carriage 8 to cause the plunger and test fitting to travel in unison with the container as long as the test fitting is in engagement therewith.

Figure 3:
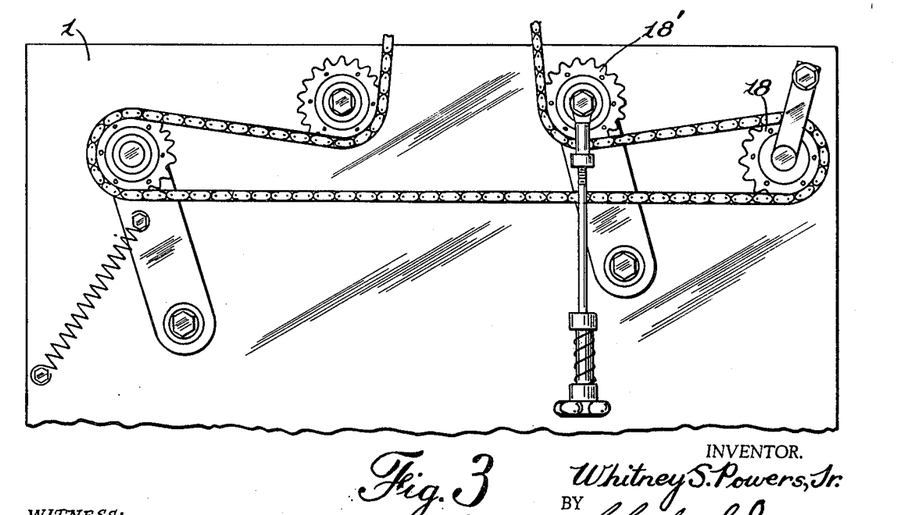
FIGURE 3 is a rear elevation, with the pump operating crank disc broken away to show the cam-operated switches and the reject cam latch and solenoid.

As best shown in FIGURES 2 and 3, this means comprises a motor 14 which drives, through suitable reduction gearing, a common operating shaft 15. A sprocket 16 is fixedly mounted on the shaft 15 and is connected by a chain 17 to a sprocket 18 fixed on a cross shaft 19, which rotates the threaded cylinder 4 by means of mitre gearing 21.

An idler sprocket 18′ is vertically adjustable to vary the length of chain between the drive sprocket 16 and the driven sprocket 18. By this means the phase relationship between the plunger 12 and the threaded cylinder 4 may be adjusted to secure exact correlation between the test fixture and the container under test.

Figure 8:
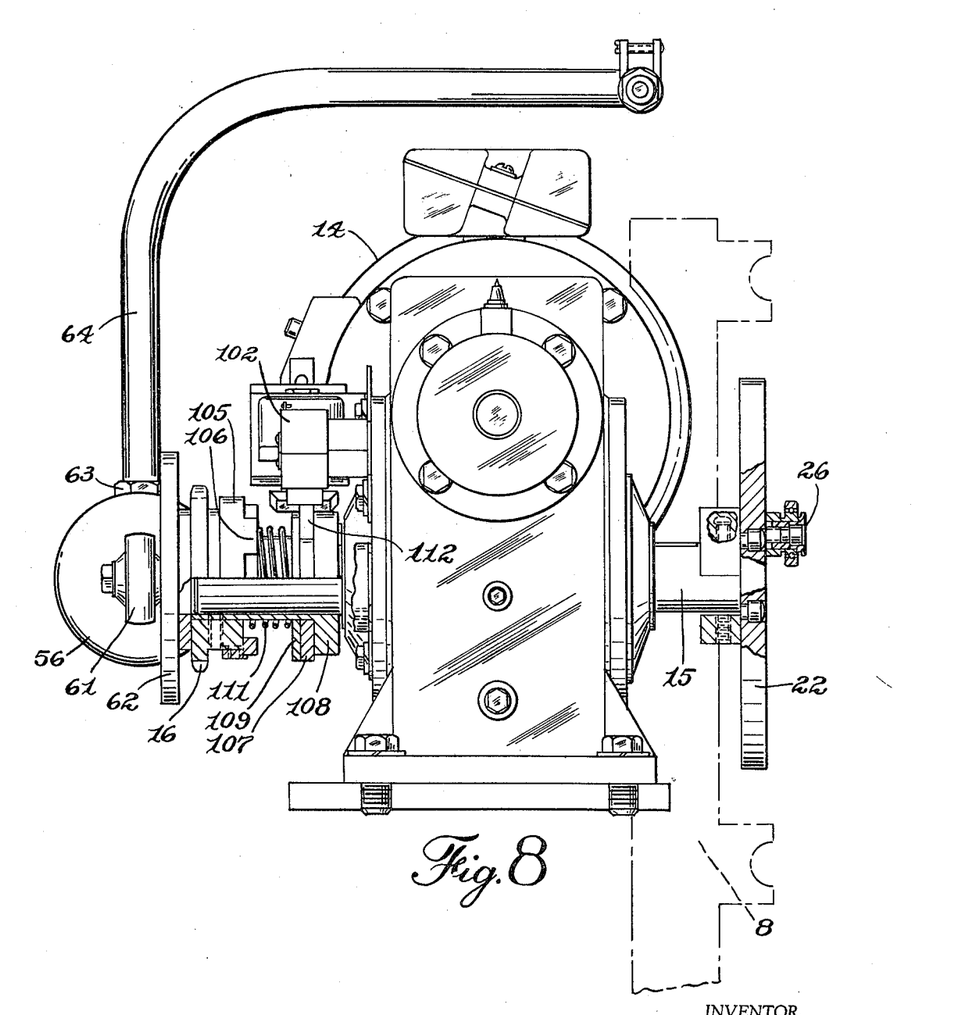
FIGURE 8 is a side elevation of the transmission assembly, broken away to show the mounting of the interrogate cam, the reject cam and the pump crank disc at one end of the cross-shaft, and with the carriage removed to show the carriage and plunger operating cam on the other end.

A cam member 22, FIGURES 1 and 8, is mounted on the other end of the common operating shaft 15 in position to project into the interior of the carriage 8, and a cam follower 23 (FIGURES 1 and 4) is mounted in the carriage in position to roll on the periphery of the cam, being held in engagement therewith by tension springs 24 and 25, attached to the carriage and to the support plate 7, whereby rotation of the cam 22 causes the carriage to reciprocate on the guide bars 9 and 11. The contour of the cam is such that, during the forward travel of the carriage, equal angular displacements of the cam cause equal linear displacements of the carriage; and the sprocket and gear drive from the common operating shaft 15 to the threaded cylinder 4 is so related to the pitch of said thread that the same equal angular displacements of the shaft 15 and cam 22 mounted thereon cause precisely the same linear displacements of the container 3 so that the container and the test fitting 13 travel in unison through the test area.

The cam 22 carries on its face an eccentrically mounted roller 26 (FIGURE 8) adapted to engage in a yoke member 27 (FIGURES 4 and 5) fixedly mounted on the plunger 12 and guided for vertical movement in the carriage 8. The roller 26 is so located on the cam as to move the plunger down to engage the test fitting 13 with the container 3 to be tested during the forward movement of the carriage, and to raise the plunger and fitting out of the path of the container during the return movement of the carriage.

The actuating mechanism for the carriage, the plunger and the article to be tested as above set forth is similar to that described in detail and claimed in applicant's prior application, Ser. No. 519,991, filed Jan. 11, 1966.

Figure 4:
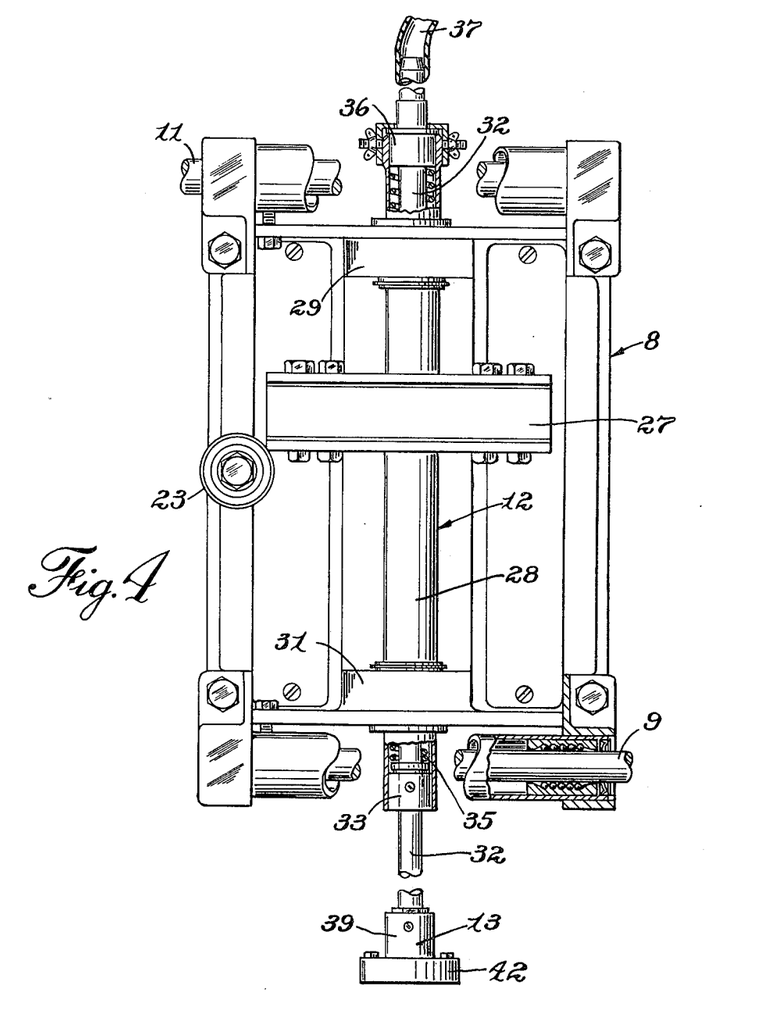
FIGURE 4 is an enlarged rear view in elevation of the test plunger and carriage assembly with some parts broken away to show interior construction.
Figure 5:
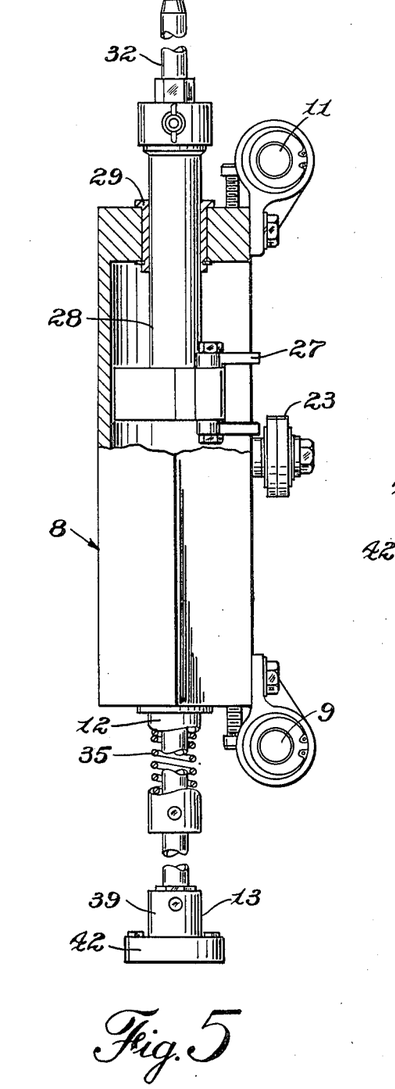
FIGURE 5 is a similar side elevation of the same.
Figure 6:
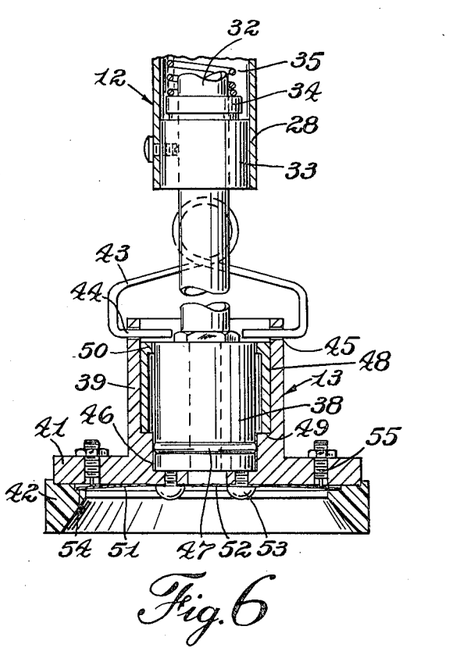
FIGURE 6 is an enlarged detail, partly in section of the test fixture and its attachment to the operating plunger.

As best shown in FIGURES 4 and 6, the plunger 12 comprises an outer sleeve 28 mounted for vertical movement in bearings 29 and 31 in carriage 8, to which the yoke 27 is attached, and a tubular member 32 slidably traversing the sleeve 28. The lower end of said sleeve has a bearing thimble 33 fixed therein, and the tube 32 has an abutment ring 34 fixed thereon to limit the downward movement of the tube by engagement with the bearing thimble 33. A compression spring 35, surrounding the tube 32 seats at its lower end on the abutment ring 34, and at its upper end engages a bearing thimble 36 fixed in the upper end of the sleeve 28, thus serving to yieldably resist upward movement of the tube in said sleeve.

The upper end of the tube 32 projects out of the sleeve 28 and is formed for attachment of a flexible hose 37; and the lower end of the tube has a nozzle member 38 of generally cylindrical contour fixedly mounted thereon.

The test fitting 13 has a hollow cylindrical body 39 having a radial flange 41 at its lower end to which an inwardly tapered ring 42 is attached for guiding the mouth of the container 3 to be tested into accurately centered position. An elastic coupling member 43 has inwardly projecting pins 44 traversing openings 45 in the upper end of the body 39 and resting on the upper end of the nozzle 38, whereby the test fitting 13 is detachably connected to said tube, with the nozzle 38 seated in a socket portion 46 of the body 39. There is sufficient clearance space for the nozzle in said socket to permit a limited amount of universal movement of the test fitting to allow it to conform to slight departures from the horizontal plane by the rim of the container 3 to be tested. Air leakage is prevented, however, by a packing gland here shown as an "O ring" 47 of elastically deformable material seated in a groove in the outer surface of the nozzle.

A sleeve 48 is slidably mounted in the cylindrical body 39 resting on an interior shoulder 49 thereof. Sleeve 48 extends to the upper end of the nozzle member 38 and is there provided with an inwardly extending flange 50 loosely surrounding said nozzle to limit the universal movement of the test fitting thereon. The detachable connection of the test fitting to the plunger facilitates substitution of suitable test fixtures when containers of different sizes are to be tested.

Figure 7:
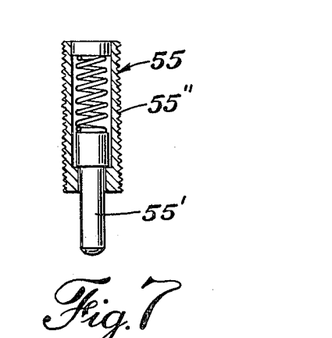
FIGURE 7 is a further enlarged sectional detail of one of the spring pressure members.

An elastic diaphragm 51 having a central opening 52 alined with the nozzle 38 is attached to the lower side of the flange 41 as by cap screws 53. The periphery of said diaphragm extends into an annular recess in the interior of the tapered ring 42 which forms a shoulder 54 limiting downward deflection of the rim of the diaphragm. A plurality of closely spaced spring thrust members 55 are mounted in the flange 41 in position to bear on the rim of the diaphragm and press it toward the shoulder 54 with a substantially uniform pressure around the circumference of the diaphragm. As shown in FIGURES 6 and 7, each of these thrust members comprises a spring-pressed plunger 55' projecting downwardly from a threaded cylinder 55" adjustably mounted in the flange 41.

Means are provided for injecting a metered volume of air into the container 3 to be tested, while the test fitting 13 is pressed down on the container, and leakage from the container resisted by the engagement of the diaphragm 51 with the sealing rim of the container.

As shown in FIGURES 3, 7 and 8 this means comprises a pump having a cylinder 56 pivotally mounted on the frame 1 of the device as indicated at 57, and having a piston 58 mounted on a piston rod 59 actuated by a wrist pin 61 on a crank disc 62 fixed on the end of the common operating shaft 15. The discharge fitting 63 of the pump is connected by a flexible hose 64 to a manifold member 65 mounted on the frame to which the hose 37 from the plunger tube 32 is attached.

In the operation of the device so far described, the conveyer 2 moves the line of containers to be tested seriatim into engagement with the threaded cylinder 4. Rotation of said cylinder then traverses the containers through the test area at a constant linear speed. As the container enters the test area, the plunger 12 is lowered by the action of the cam-operated roller 26 on the yoke 27 to place the test fitting 13 on the mouth of the container and press it firmly thereon by compression of the spring 35. At the same time, the carriage 8 is traversed by the cam 22 in unison with the movement of the container. These elements are so related and synchronized that the engagement of the test fitting with the container is maintained during the major portion of the 180 degrees of rotation of the cam 22 which causes the forward traversal of the carriage 8.

During this one-half rotation of the cam 22 by the common operating shaft 15 on which it is mounted, the crank disc 62, also mounted on said shaft, is effective to move the pump piston 58 through its discharge stroke, thus injecting a charge of air, metered by the stroke of the pump, into the container under test. At the conclusion of this discharge stroke, while the test fitting 13 still closes the mouth of the container under test, the air pressure retained in the container is gauged to determine whether an excessive leakage past the diaphragm 51 has taken place due to imperfections in the lip of the container.

The gauging means comprises a differential-pressure electrical switch 66 (FIGURE 10) having a sealed body in which contacts 67, 68 are located in a central chamber 69 between two flexible diaphragms 71 and 72. Spring contact arms 73, 74 are fixedly mounted in the chamber 69, in engagement with the diaphragms 71, 72 and electrically connected by a rivet 75 in such positions that inward pressure of said diaphragms causes the arms 73, 74 to engage the contacts 67, 68 and complete a bridging circuit closing the switch 66.

Figure 10:
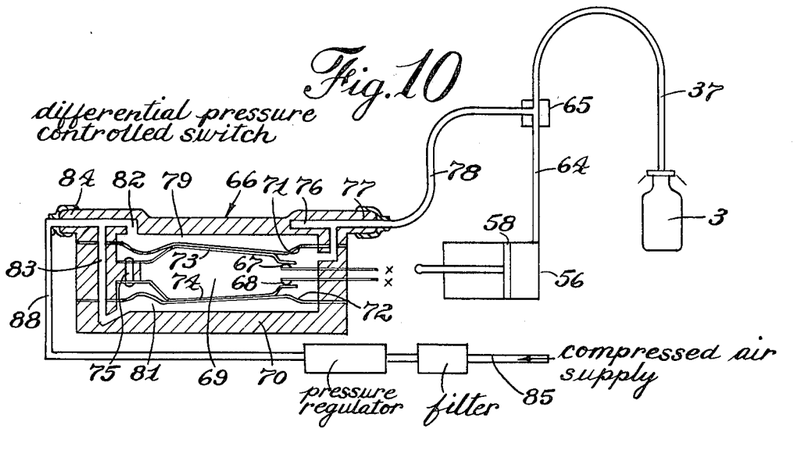
FIGURE 10 is a schematic diagram of the pneumatic system.

A passage 76 in the body 70 of the switch 66 leads from the central chamber 69 to a nipple 77 which is connected by a hose 78 to the manifold 65. Chambers 79, 81 in the body 70 of the switch outside of the diaphragms 71, 72 are connected by passages 82, 83 to a nipple 84.

A source of constant air pressure of any suitable kind is connected through a hose 85 and filter 86 to an adjustable pressure regulator 87 the output of which is connected by a hose 88 to the nipple 84. The switch 66 is so constituted that when the central chamber 69 is at atmospheric pressure, the constant regulated pressure in chambers 79 and 81 flexes the diaphragms 71, 72 to engage the contacts 67, 73 and 68, 74 to close the switch. When the pressure in the central chamber 69 equals or exceeds a predetermined critical value, however, the contacts are disengaged thereby, and the switch opened.

Figure 11:
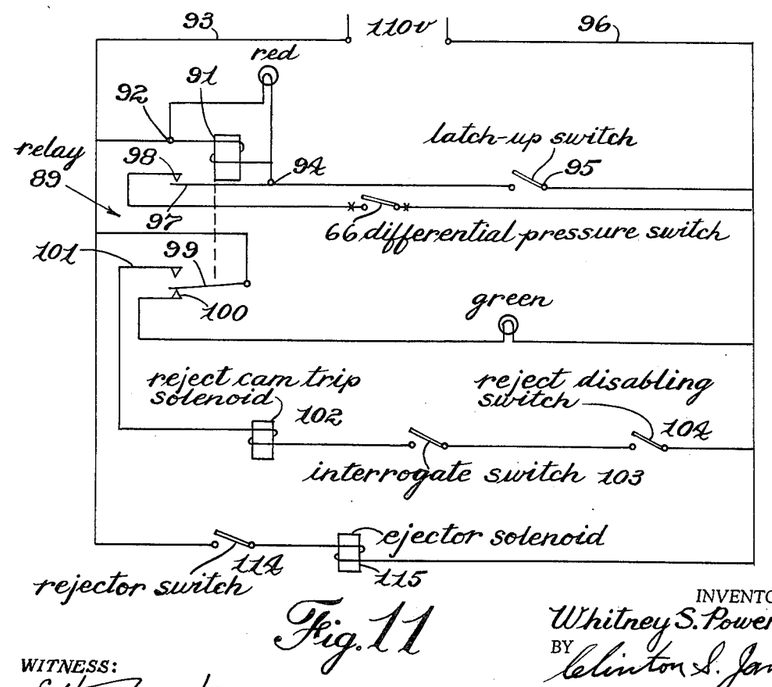
FIGURE 11 is a wiring diagram of the electrical system.

An electrically actuated system controlled by the differential-pressure switch 66 is provided for ejecting defective containers from the line. As shown in FIGURE 11, this system comprises a source of electrical power, a relay 89, having a coil 91, one terminal 92 of which is connected to one feed line 93 from the source of power, and the other terminal 94 is connected through a latch-up microswitch 95 to the other feed line 96 so that closure of said switch causes energization of coil 91. A red signal light is bridged across the relay coil to indicate when the relay is energized.

The relay 89 is provided with two sets of normally open contacts 97, 98 and 99, 101. Contact 97 is connected to the terminal 94 of the relay, and cooperating contact 98 is connected through the differential pressure switch 66 to the power feed line 96, thereby completing a holding circuit for maintaining the energization of the relay coil 91 as long as switch 66 is closed.

Relay contacts 99, 101 are located in an arming circuit which is operative to cause actuation of an ejector element a predetermined time after closure of the arming circuit. For this purpose, contacts 99, 101, when closed by energization of relay 89, connect the feed line 93 to one terminal of a reject cam latch solenoid 102, the other terminal of which is connected through a normally open interrogate micro-switch 103 and a manuallly operable disabling switch 104 to the other feed line 96 to complete the arming circuit.

A contact 100, normally engaged by relay contact 99, serves to light a green signal lamp when the relay 89 is not energized.

Figure 9:
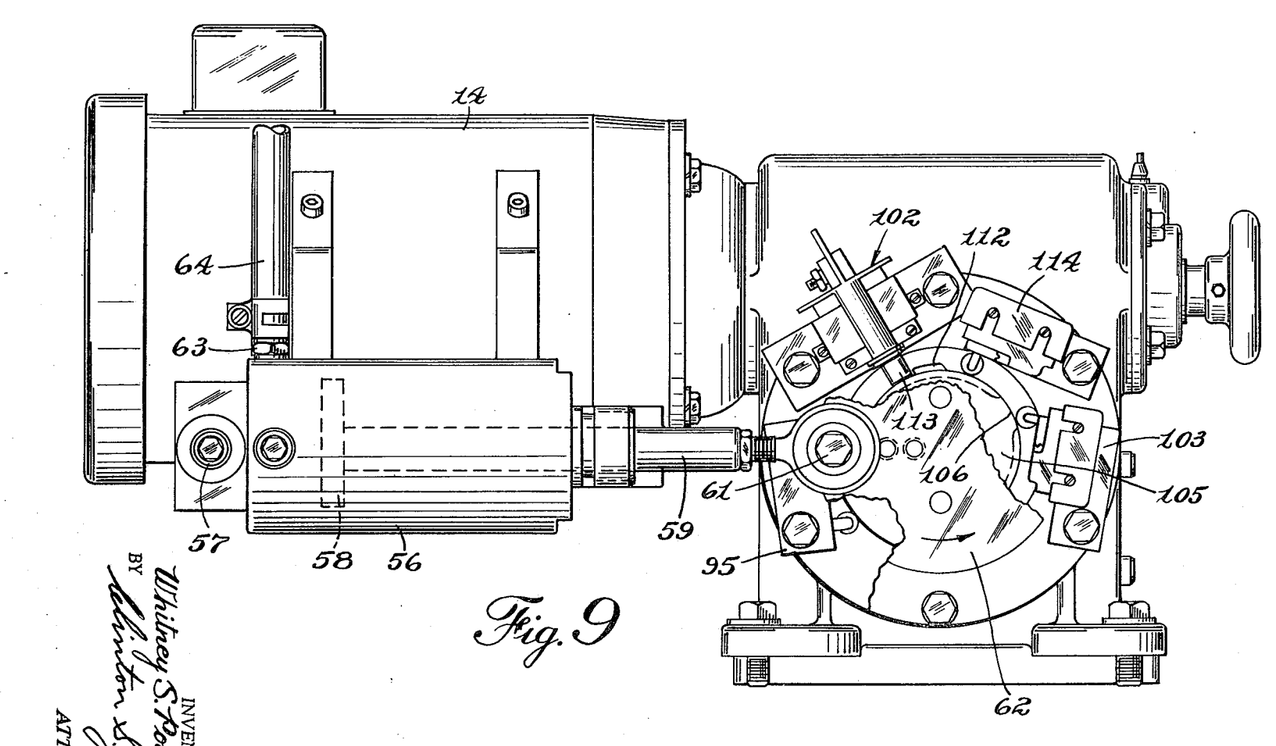
FIGURE 9 is a rear elevation of the transmission and pump assembly, broken away to show the interrogate and reject cam operated switches, and the reject cam latch and solenoid.

FIGURES 8 and 9 of the drawing show more particularly the operating means for the latch-up switch 95 and the interrogate switch 103. As there shown, an interrogate cam disc 105 is fixedly mounted on the operating shaft 15 in such a position that the lobe 106 engages and closes the latch-up micro-switch 95 shortly after the piston 58 of the pump has started on its discharge stroke, and the same lobe engages and closes the interrogate micro-switch 103 at approximately the end of said discharge stroke as shown in FIGURE 9.

A reject cam disc 107 is rotatably mounted on a flanged collar 108, fixed on the shaft 15, and is frictionally connected to rotate therewith by a clutch disc 109 pressed against it by a spring 111. The reject cam has a lobe 112 which normally engages the latch 113 of the solenoid 102 whereby the reject cam is prevented from rotating. When the solenoid 102 is energized, the latch is withdrawn, permitting the reject cam to rotate with shaft 15, and after nearly a complete rotation, it engages and closes a rejector micro-switch 114. This switch, as shown in FIGURE 11, is in circuit with an ejector solenoid 115 (FIGURE 1) located by the path of the containers as they emerge from the test area, in such position that its armature 116 will push the adjacent container off the conveyor when the eject solenoid is energized.

This rejection mechanism is also shown and described in applicant's prior application above cited.

To now complete the description of the operation, as a container enters the test area, the test fitting 13 is brought down to close the container, the pump begins to inject air into the container and at the same time the latch-up switch 95 is momentarily closed by the interrogate cam 105. The consequent energization of the relay coil 91 closes contacts 97, 98 completing a holding circuit for the relay through the differential-pressure switch 66, which is closed because the pressure in the container has not yet built up enough to open the switch contacts.

As the pump piston reaches the end of its discharge stroke, the interrogate cam lobe 106 engages and closes the interrogate switch 103. If, prior to this time, the pressure in the container, and consequently in the interior chamber 69 of switch 66, has built up enough to equal or exceed the effect of the predetermined constant pressure in the outer chambers 79, 81 of said switch, the contacts of the switch are disengaged. The relay 91 is therefore deenergized, its contacts 99, 101 are open, and energization of the reject cam latch solenoid 102 is prevented. The container is thereby permitted to proceed on the conveyor.

If, however, the sealing surface of the container is so defective as to cause an unacceptable leakage of air past the diaphragm 51 of the test fitting, the air pressure in the container will fail to open the contacts of the differential-pressure switch 66. The relay 91 is therefore held closed and closure of the interrogate switch 103 is then effective to arm the rejection system by energizing the reject cam latch solenoid 102. This withdraws the latch 113 and permits the reject cam 107 to rotate with shaft 15. When the defective container has been traversed into juxtaposition with the eject solenoid 115, the lobe 112 of the reject cam engages and closes the rejector switch 114, and the consequent energization of solenoid 115 causes the container to be thrown off the conveyer belt.

Although certain structure has been shown and described in detail, it will be understood that changes may be made in the design and arrangement of the parts without departing from the spirit of the invention.

I claim:

1. A device for testing the finish of a sealing surface of the rim of a sealable container comprising injection means for injecting a metered volume of air into the container being tested, said injection means including a flat flexible diaphragm yieldably engageable with the container rim for opposing the escape of air from the container, means for traversing the container through a test area in a straight line at uniform speed during the test operation, carriage means mounting said injection means for linear movement with the container during testing, means for gauging pressure existing in the container at the conclusion of said injection and rejecting the container as defective if said pressure is below a predetermined minimum due to leakage past the diaphragm, and uniformly distributed calibrated resilient pressure means effective on the periphery of said diaphragm urging it into conformity with the contour of the rim of the container when the diaphragm is pressed against the container.

2. A device in accordance with claim 1 including further means for positively limiting flexure of the outer peripheral portion of said diaphragm.

3. A device for testing the finish of the sealing surface of the rim of a sealable container comprising means for injecting a metered volume of air into the container, means for simultaneously opposing the escape of air from the container including a flat elastic diaphragm yieldably pressed on the rim, means for gauging the pressure existing in the container at the conclusion of said injection and rejecting the container as defective if said pressure is below a predetermined minimum due to leakage past the diaphragm, means for traversing the container through a test area at uniform speed during the test operation, the means for rejecting a defective container including an ejection system, said ejection system being armed responsive to sub-standard retained pressure in the container under test to actuate an ejecting device after the container has been traversed beyond the test area, the means for injecting air into the container including a reciprocatory piston pump, means for conducting the air discharged by said pump through said diaphragm into the container under test, and common operating means for actuating the pump and for engaging the diaphragm with the rim of the container throughout the discharge of the pump.

4. A device in accordance with claim 3 including a carriage supporting said means for injecting air into the container, and means mounting the carriage for linear straight line movement with the container as the container moves through the test area.

5. A device as set forth in claim 3 in which the means for gauging the pressure in the container under test comprises a source of predetermined constant gaseous pressure and     a differential-pressure actuated element connected to said source and to said container and operative to cause rejection of the container if the effect of the standard pressure on said device predominates over the effect thereon of the pressure in the container.

6. A device as set forth in claim 5 in which said differential-pressure element is in the form of an electrical switch, and     the means for causing rejection of a defective container comprises a rejection electrical circuit including a rejector switch and an ejector element, and means controlled by said differential-pressure switch for arming the rejection circuit to cause delayed actuation of the ejector element.

7. A device as set forth in claim 6 in which said rejection circuit includes a normally open rejector switch,
means, operable in timed relation to the traversal of the container under test, for closing said switch,
a latch member normally holding said switch closing means inoperative, and
means in said arming electrical circuit for withdrawing said latch.

8. A device as set forth in claim 6 in which said arming means includes a relay having two sets of normally open contacts,
a circuit for causing initial energization of said relay including a normally open latch-up switch,
a holding circuit for said relay including one set of its contacts and said differential-pressure switch in series, and
an ejector-arming circuit including in series the other set of said relay contacts, a solenoid-actuated arming device and a normally open interrogate switch.

9. A device as set forth in claim 8 including means for momentarily closing the latch-up switch during the injection stroke of the pump, thereby completing the holding circuit through the differential-pressure switch, and
means for closing the interrogate switch approximately at the completion of said stroke.

10. A device as set forth in claim 8 in which said common operating means for actuating the pump includes a rotatable shaft,
a cam fixedly mounted on the shaft in position to engage and momentarily close said latch-up switch during the injection stroke of the pump, and thereafter to engage and close the interrogate switch at approximately the end of said injection stroke;
a rejector cam rotatably mounted on said shaft, frictionally connected to rotate therewith in position to engage and close said rejector switch; and
a latch normally preventing rotation of the rejector cam,
said solenoid-actuated arming device being operative to withdraw the latch and permit the rejector cam to close the rejector switch after a predetermined arc of rotation.

References Cited

UNITED STATES PATENTS

| | | | |
|---|---|---|---|
| 1,884,942 | 10/1932 | Widell | 73—41 |
| 1,971,065 | 8/1934 | Dieter | 73—45.2 |
| 3,374,887 | 3/1968 | Paruolo | 73—37 |

LOUIS R. PRINCE, Primary Examiner

W. A. HENRY II, Assistant Examiner

U.S. Cl. X.R.

73—37